Dec. 15, 1931.  C. L. COOK  1,837,115
SCRAPING MEANS
Filed April 9, 1927   2 Sheets-Sheet 1

Inventor,
C. Lee Cook.
By
Attorney

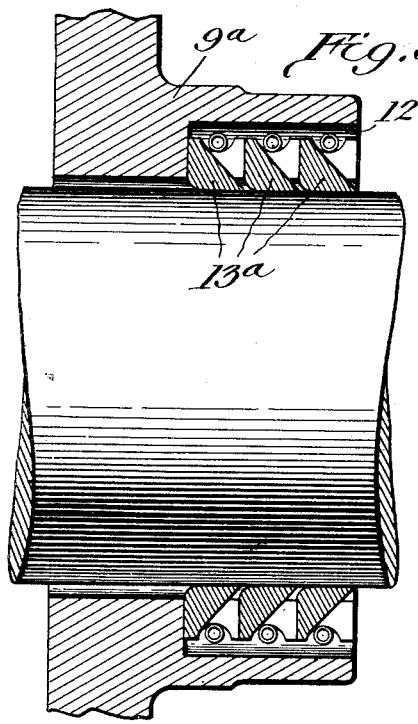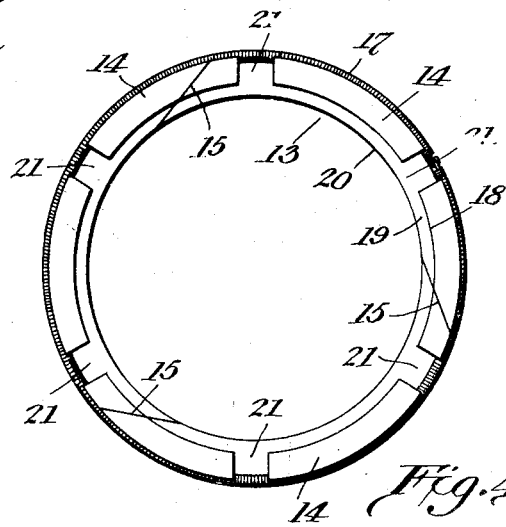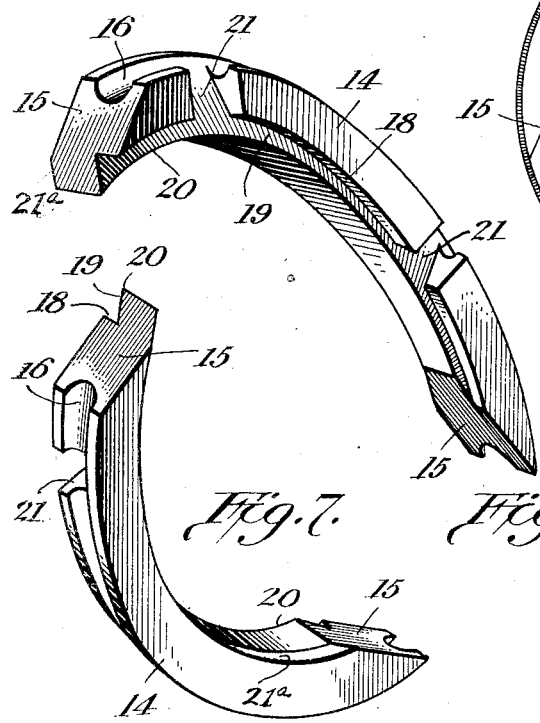

Patented Dec. 15, 1931

1,837,115

UNITED STATES PATENT OFFICE

CHARLES LEE COOK, OF LOUISVILLE, KENTUCKY; GULIELMA STILES COOK, EXECUTRIX OF SAID CHARLES LEE COOK, DECEASED, ASSIGNOR TO C. LEE COOK MANUFACTURING COMPANY, OF LOUISVILLE, KENTUCKY, A CORPORATION OF KENTUCKY

SCRAPING MEANS

Application filed April 9, 1927. Serial No. 182,337.

The present invention relates more particularly to packing means, and especially means for removing the lubricant or other accumulations from a piston rod or like member. For example in compressing or transferring some gaseous materials, the same should be free from any lubricating oil, but with the ordinary packing, the piston rod of the compressor is apt to carry a film of the lubricant into the cylinder. It is the object to provide effective means for taking off this film prior to the passage of the rod into the compressor. Obviously it is capable of use in many other analogous relations.

In the accompanying drawings:

Figure 3 is a sectional view through a modified form of construction,

Figure 4 is a view in elevation of the front or operating face of the scraper ring, Figure 5 is a view in elevation of the rear face of the same, Figure 6 is a perspective view of one of the segments, showing the operative or scraping face, Figure 7 is a perspective view of the segment but reversed and showing more particularly the rear face.

Figure 1:
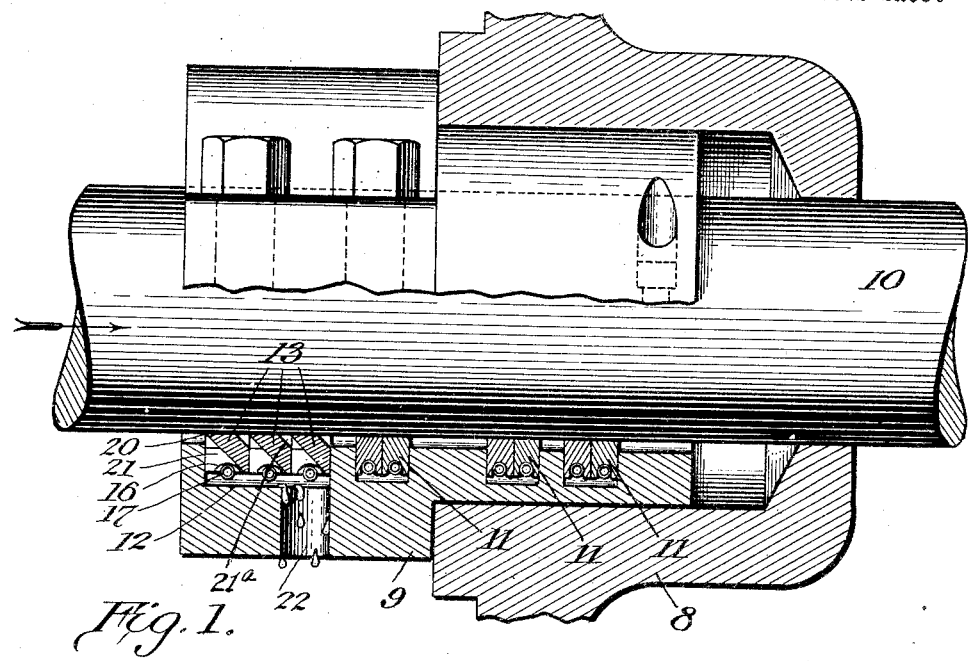
Figure 1 is a longitudinal sectional view through a stuffing box, in which the improvement is embodied.
Figure 2:
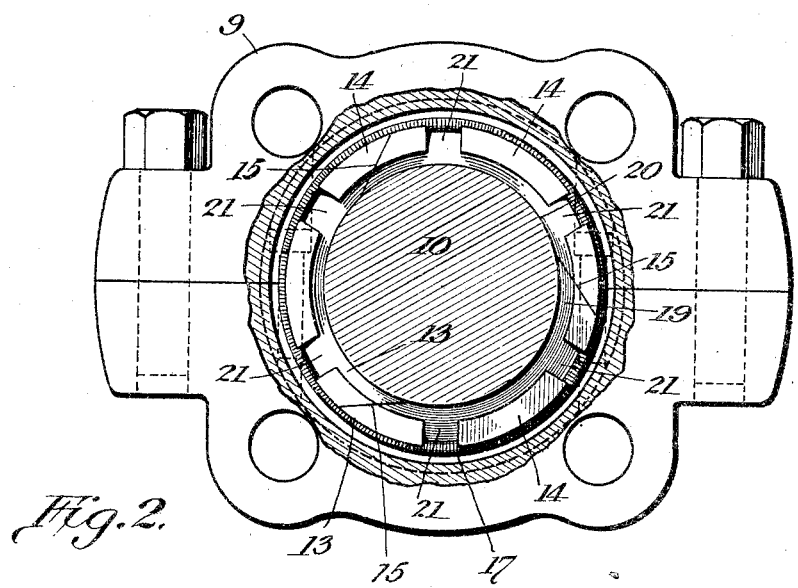
Figure 2 is a face view of the same with portions broken away.

Referring first to the embodiment shown in Figures 1 and 2, a portion of a cylinder head is illustrated at 8, and carried thereby is a stuffing box 9, through which the piston rod, a portion of which is shown at 10, passes, and in which it reciprocates. This stuffing box may have suitable packing rings, three sets thereof being shown and designated 11.

In the outer end of the stuffing box 9 is formed a chamber or recess 12 that surrounds the piston rod 10 and in this chamber are fitted a plurality of scraping rings, three being shown and designated 13. These rings are duplicates and are illustrated in detail in Figures 4-7 inclusive. Each ring consists of segments 14, three being shown as constituting the complete ring, though this number may be varied. The joints between the segments are diagonally disposed as shown at 15. The ring is provided in its peripheral face with an annular groove 16, forming a seat for a compressing spring 17. The spring 17 is of the coiled variety and obviously serves to contract the ring and insure its complete contact with the piston rod.

The front or active side of the ring is provided with a groove 18, the bottom face of which is beveled as shown at 19 and forms with the internal face of the ring, a scraping edge 20. Leading from the bottom of the groove are transverse channels 21, two being shown in each segment, though the number may be varied. These channels open into the peripheral groove 16 and their bottoms are preferably continuations of the beveled bottom face 19 of the groove 18. The rear face of each ring is beveled as shown at 21a.

As shown particularly in Figure 1, the rings are placed one behind the other in the recess 12, and thus the rear face of one abuts against the front face of the next adjacent. The scraping edges moreover are in direct association with the surface of the piston rod 10. As a consequence when the rod moves into the cylinder or in the direction shown by the arrow in Figure 1, the scraping edges 20 remove from the surface of the piston, lubricant or any other accumulation of materials. This finds an outlet through the channels 21 to the peripheral grooves 16, and flowing down to the lower side of the same, will drop off into the bottom of the recess. The rear bevel 21a provides ample clearance between the outer portions of abutting rings that allows the free flow of oil to the drain. The recess is provided with a suitable outlet 22 for the escape of the material, as indicated in Figure 1.

With this construction it has been found that the piston rod will enter the interior of the cylinder in entirely clean condition, while the packing rings 11 still perform their usual packing functions.

Under some conditions where packing rings are unnecessary the scraping rings may still be employed as illustrated in Figure 3, wherein the stuffing box 9a is provided with a recess 12a in which the rings 13a are located.

It will be understood that these rings are duplicates of those already described and act in exactly the same manner.

From the foregoing, it is thought that the construction, operation and many advantages of the hereindescribed invention will be apparent to those skilled in the art, without further description, and it will be understood that various changes in the size, shape, proportion and minor details of construction, may be resorted to without departing from the spirit or sacrificing any of the advantages of the invention.

What I claim, is:—

1. A scraper ring comprising segments, said ring having a peripheral groove and having an annular groove in one of its sides, one wall of the side groove forming with the internal face, a scraping edge, a contractile spring in the peripheral groove for holding the segments in contracted relation and transverse slots extending from said side groove to the peripheral groove, and constituting outlet channels from the former to the latter, said slots being cut in the side of the ring having the side groove and having their outer sides open throughout their length.

2. In a scraper ring, the combination with a member to be scraped, of a box in which it operates having a recess, and a plurality of scraping rings located side by side in the recess, each of said rings having a groove in one of its side faces, forming with the inner face a scraping edge, the rear side of the ring in advance closing the open front face of the groove in the succeeding ring and having its inner portion cut away and spaced from the adjacent portion of the coacting ring, to expose the scraping edge thereof, and each of said rings having outwardly flared outlet channels in the outer portion extending from the peripheries of the groove to the outer side of the ring.

3. In a scraper ring, the combination with a member to be scraped, of a box in which it operates having a recess, and a plurality of scraping rings located side by side in the recess, each of said rings having a groove in one of its side faces forming with the inner face a scraping-edge, the rear side of the ring in advance closing the open front face of the groove of the ring behind it and being beveled and spaced from the adjacent portion of the coacting ring to expose the scraping edge thereof, each of said rings further having a peripheral groove and transverse slots opening through the front faces of the rings and forming outlet channels affording communication between said grooves, and contracting springs in the peripheral grooves.

In testimony whereof, I affix my signature.

CHARLES LEE COOK.